(12) United States Patent
Wirth

(10) Patent No.: US 8,578,820 B2
(45) Date of Patent: Nov. 12, 2013

(54) ELECTRICAL WIRE TOOL

(76) Inventor: Reinhold Franz Wirth, Sandia Park, NM (US)

( * ) Notice: Subject to any disclaimer, the term of this patent is extended or adjusted under 35 U.S.C. 154(b) by 566 days.

(21) Appl. No.: 12/768,483

(22) Filed: Apr. 27, 2010

(65) Prior Publication Data
US 2010/0269637 A1    Oct. 28, 2010

Related U.S. Application Data

(60) Provisional application No. 61/173,407, filed on Apr. 28, 2009.

(51) Int. Cl.
*H02G 1/12* (2006.01)
*B25B 13/00* (2006.01)
*B25B 13/28* (2006.01)

(52) U.S. Cl.
USPC .............. 81/9.4; 81/9.51; 81/90.1; 81/90.2; 81/90.3; 81/90.4

(58) Field of Classification Search
USPC ........ 81/9.4, 9.51; 30/90.1–90.4; 269/3, 6, 95
See application file for complete search history.

(56) References Cited

U.S. PATENT DOCUMENTS

| 3,489,041 | A |  | 1/1970 | Havenstein et al. |  |
|---|---|---|---|---|---|
| 3,731,722 | A |  | 5/1973 | Carr |  |
| 3,769,862 | A |  | 11/1973 | Miller |  |
| 3,787,948 | A |  | 1/1974 | Runge |  |
| 3,812,741 | A |  | 5/1974 | Heine |  |
| 3,914,864 | A | * | 10/1975 | Prince | 30/90.6 |
| 4,679,468 | A |  | 7/1987 | Gray |  |
| 4,823,650 | A |  | 4/1989 | Tuttle |  |
| 5,887,631 | A |  | 3/1999 | Eaton |  |
| 2006/0242839 | A1 | * | 11/2006 | Landes et al. | 30/90.4 |

* cited by examiner

*Primary Examiner* — Lee D Wilson
*Assistant Examiner* — Danny Hong
(74) *Attorney, Agent, or Firm* — Becker & Stachniak, P.C.; Robert Becker

(57) ABSTRACT

The present invention can include an apparatus having both a wire nut receiver and a wire insulation stripper thus allowing a user to strip insulation from wires and then connect them using a wire nut with the same apparatus. The apparatus can include a wire nut receiver defining a cavity having a proximal end and a distal end and one or more stripper blades disposed adjacent to the distal end of the cavity of the wire nut receiver. The apparatus can also include a driver, such as for example a hex driver, connected to the wire nut receiver and the one or more stripper blades. Alternatively, the apparatus can be configured such that the diameter of the one or more stripper blades relative to a rotational axis is variable, which in turn allows a user to easily account for different thicknesses or gauges of wire to be stripped.

19 Claims, 3 Drawing Sheets

ELECTRICAL WIRE TOOL

CLAIM OF PRIORITY

The present application claims priority to U.S. provisional patent application Ser. No. 61/173,407 filed on Apr. 28, 2009, entitled "Electrical Wire Tool," which is incorporated by reference herein in its entirety.

BACKGROUND AND SUMMARY

1. Technical Field

The present invention relates generally to the field of tools, and more specifically to the field of apparatuses and/or tools for use in electrical work and home improvement.

2. Summary of the Present Invention

In the United States and other countries, many people, including homeowners and professional electricians, engage in sophisticated electrical work that includes the wiring of numerous electrical devices both within and without the home itself. Aside from the electrical work involving making connections, grounding wires, and ensuring safe operation of electrical devices, typical work includes both stripping of the insulation covering the wires as well as protecting exposed wires with one or more wire nuts. While the manual burden of a great deal of tasks has been lessened greatly with the advent of the electric or handheld drill, a great deal of electrical work is still performed manually.

While it is relatively easy to drill holes and drive screws, it is still relatively time consuming and hazardous to perform electrical work on wires. In particular, the manual stripping of wire insulation usually involves the use of a specialized hand tool or a knife to strip the insulation, which can invariably lead to injury to the user. While fastening of a wire nut is relatively safer for a user, it still is a time consuming and labor-intensive practice, particularly for larger-scale projects. Therefore there is a need in the art for a tool or apparatus that allows a user to easily and safely strip the insulation layer from one or more wires as well as increase the efficiency of the wire nut fastening process.

Accordingly, various preferred and exemplary embodiments of the present invention are disclosed in the present specification. In one exemplary embodiment, the present invention can include an apparatus having both a wire nut receiver and a wire insulation stripper thus allowing a user to strip insulation from wires and then connect them using a wire nut with the same apparatus. As described in greater detail below, the apparatus can include a wire nut receiver defining a cavity having a proximal end and a distal end and one or more stripper blades disposed adjacent to the distal end of the cavity of the wire nut receiver. The apparatus can also include a driver connected to the wire nut receiver and the one or more stripper blades. The driver can be any type of suitable driver usable with either a manual or power drill interface such that the driver will rotate the wire nut receiver and one or more stripper blades in response to an external torque. In other exemplary embodiments, the apparatus can be configured such that the diameter of the one or more stripper blades relative to a rotational axis is variable, which in turn allows a user to easily account for different thicknesses or gauges of wire to be stripped. In still other exemplary embodiments, the one or more stripper blades can be aligned at a predetermined angle to maximize their efficiency in removing the insulation from electrical wires.

These features as well as other features and benefits of the various embodiments of the present invention are described in detail below with reference to the appended figures.

DESCRIPTION OF THE PREFERRED EMBODIMENTS

Figure 1:
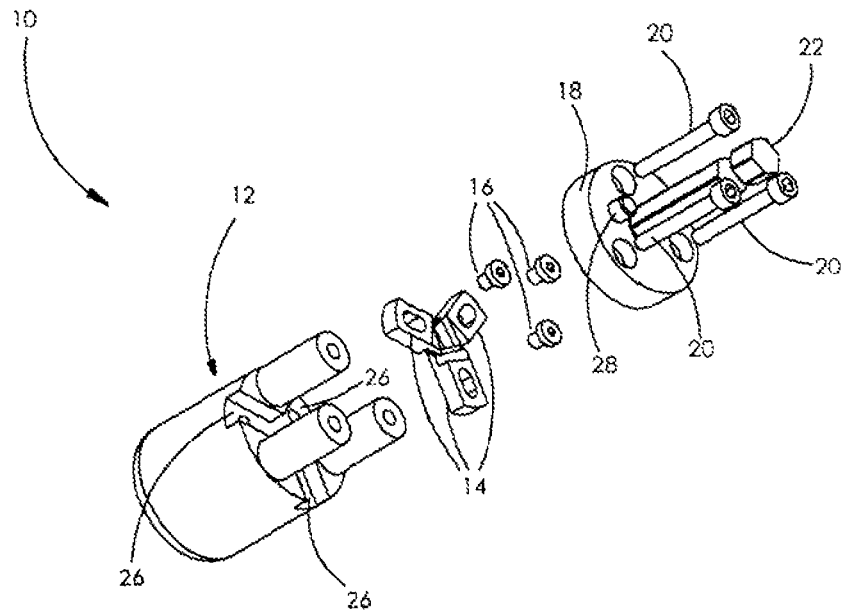
FIG. 1 is an exploded view of an apparatus in accordance with a preferred embodiment of the present invention.
Figure 2:
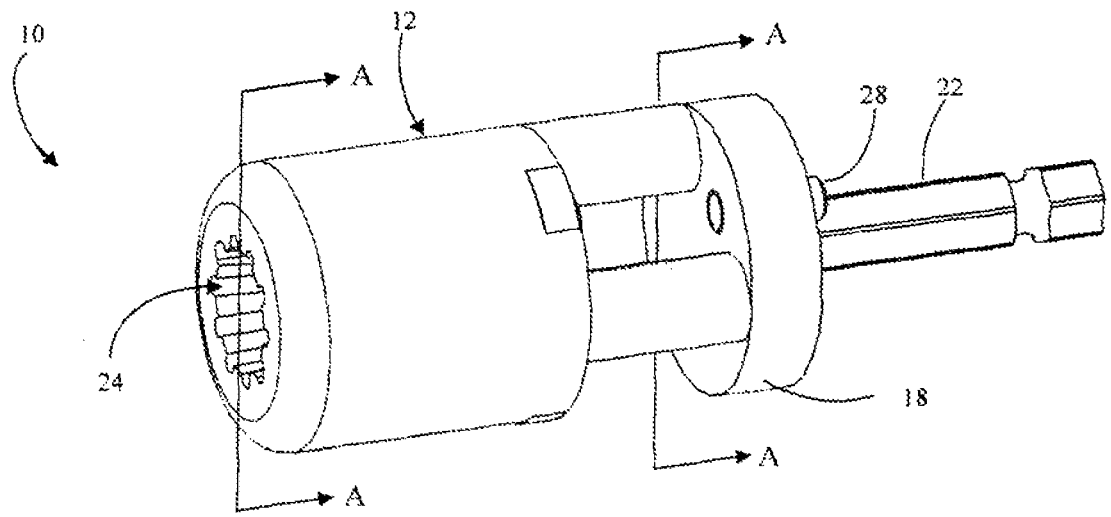
FIG. 2 is a front perspective view of the apparatus shown in FIG. 1.
Figure 3:
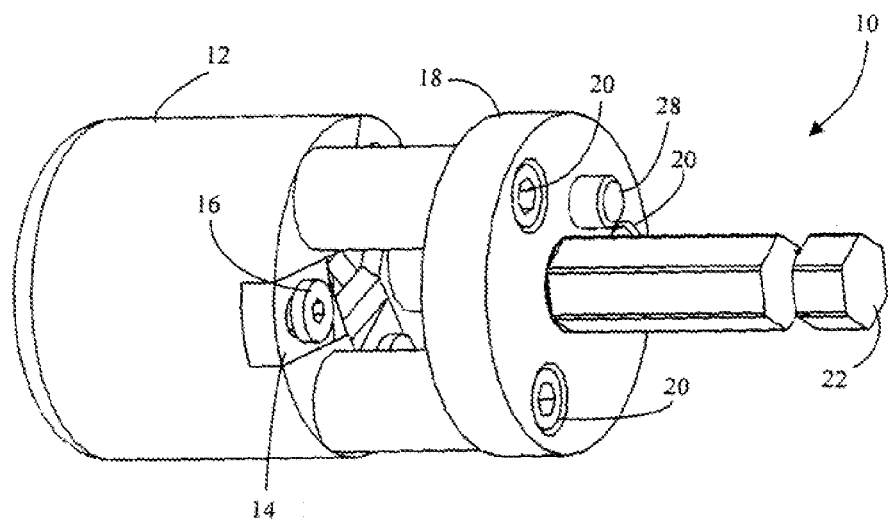
FIG. 3 is a rear perspective view of the apparatus shown in FIGS. 1 and 2.

The following description of the preferred embodiments of the invention is not intended to limit the invention to this preferred embodiments, but rather to enable any person skilled in the art of electrical tools to make and use this invention.

As shown in FIGS. 1 through 4, an apparatus 10 of the preferred embodiment can generally include a housing 12 defining a wire nut receiver 24 on a first end 12a and a stripper blade receiver 26 on an opposite end 12b. The wire nut receiver 24 is adapted to engage with a wire nut (not shown) usable by one of skill in the art of electronics for fastening a wire nut to one or more electrical wires. In a variation of the apparatus 10 of the preferred embodiment, the wire nut receiver 24 can be configured to engage any of a standard wire nut, a wing nut, or a grounding wire nut. The wire nut receiver 24 portion of the housing 12 can further define a hollow or channel though which one or more wires can be placed to engage with one or more stripper blades 14. The stripper blade receiver 26 is adapted to receive one or more stripper blades 14 that function to strip the rubberized coating from one or more wires when the stripper blades 14 are rotated, for example by a drill motor.

As shown in the Figures, the apparatus 10 can include three stripper blades 14 arranged uniformly about a circumference of the housing 12. In alternative embodiments, the apparatus 10 of the preferred embodiment can include between one stripper blade 14 and any number of stripper blades 14 suitable for integration and/or connection to the housing 12. The one or more stripper blades 14 can be removably and adjustably fastened to the housing 12 using one or more stripper bolts 16 as shown in FIG. 1. Adjustment of the one or more stripper blades 14 allows for adequate clearance between the cutting edge of the stripper blade 14 and the wire sheathing to prevent any damage to the wire, while also permitting the user to adjust said clearance for different gauge wires when desired.

Figure 4:
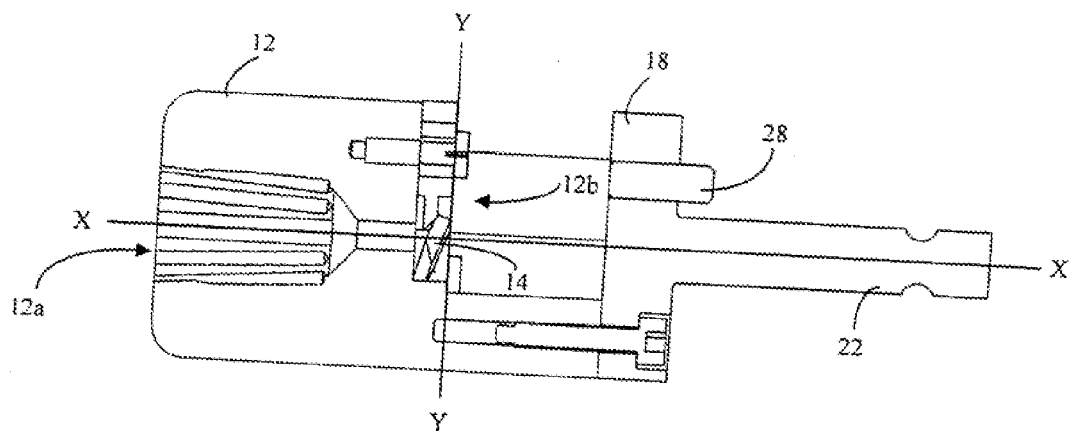
FIG. 4 is a cross-sectional view of the apparatus in accordance with one or more variations of the preferred embodiment of the present invention.

As shown in FIG. 4, in one variation of the apparatus 10 of the preferred embodiment, the wire nut receiver 24 generally defines a cavity along a longitudinal axis X about which the entire apparatus 10 is rotatable. The stripper blades 14 can be arranged such that a cutting angle or leading edge is disposed at an acute angle relative to a plane Y normal to the longitudinal axis X. As shown in the Figures, in another variation of the apparatus 10 of the preferred embodiment, the stripper blades 14 can be circumferentially disposed about the longitudinal axis X such that the stripping function is substantially uniform at any predetermined radius measured from the longitudinal axis X. In one variation of the apparatus 10 of the preferred embodiment, the stripper blades 14 have a lead cutting angle that is less than approximately 20 degrees. More particularly, the lead cutting angle can range between 10 and 20 degrees. Alternatively, the lead angle of the stripper blades 14 can be approximately 15 degrees, which permits for self-feeding of the wires similar to the helix angle found on a threaded mechanical fastener. Other fasteners known to those of skill in the art that perform the fastening function, either permanently or removably, can also be used to secure the stripper blades 14 to the housing 12.

The apparatus 10 of the preferred embodiment can further include a driver 18 such as a hex drive flange that is removably fastenable to the housing 12 via one or more flange bolts 20 or other suitable fastening means. The driver 18 can include a drive 22 that permits a user to removably secure the apparatus 10 into a drill chuck, receptacle or receiver (not shown) of a power drill or other apparatus usable by electricians and home improvement enthusiasts. The drive 22 can be configured as a hex drive that generally defines a hexagonal cross section for easy integration into standard receivers on commonly used power tools known to those of skill in the art. Alternative cross sections are also possible for removably attaching the apparatus 10 to other suitable drivers, including for example square cross sections or any other standardized male/female engaging means.

In another variation of the apparatus 10 of the preferred embodiment, the driver 18 can further include a post 28 of a predetermined radius for permitting a user to loop a ground wire into a suitable shape for attachment to the ground connection. As shown in the Figures, the post 28 can be disposed on an anterior side of the driver 18 adjacent to the drive 22. The post 28 can be of a substantially cylindrical shape, or any other suitable shape and/or cross-section for permitting a user to properly loop a ground wire. In one exemplary configuration, the post 28 can be a substantially cylindrical shape with a diameter corresponding to eight gauge wire, approximately one eighth of one inch in diameter. Other shapes and diameters will be apparent to those of skill in the art.

In use, a user attaches the apparatus 10 to a drill or other rotary device (not shown) via the drive 22 (shown as a hex drive) and runs one or more sheathed and/or coated wires through the wire nut receiver 24 on the housing. Upon activating the drill, the apparatus 10 begins to rotate in the selected direction in response to the torque provided by the drill, which in turn causes the stripper blades 14 to remove the sheath from the wires. Upon removal of the sheath, a user can insert an empty wire nut into the wire nut receiver and place the newly stripped wires into the wire nut. Activation of the drill again causes rotation of the apparatus 10, which in this functionality causes the wire nut to fasten the wires together. The user can then remove the apparatus 10 from the drill and use the post 28 to properly create a loop in the grounding wire, after which the electrical connections can all be satisfactorily completed. As is readily appreciated, the apparatus 10 of the preferred embodiment allows a user to easily strip and fasten wire nuts to one or more electrical wires without having to touch the wires or handle any sharp, electrified or otherwise dangerous implements in performing these tasks.

In another alternative embodiment, the apparatus 10 of the preferred embodiment could be used as a wire stripper only without the wire nut functionality by either fastening the stripper blades 14 directly to the driver 18 (depicted as a hex drive flange) or by replacing the housing 12 with another suitable housing (not shown) having a channel therein for receiving one or more wires. Thus for example, an alternative housing could include a larger diameter channel for receiving larger gauge wires. In another alternative embodiment, the apparatus 10 of the preferred embodiment could include a second alternate housing (not shown) that is adapted to engage grounding wire nuts that typically define a hole though the center and wings similar to those found on a wing nut, allowing one wire to protrude though the middle for electrical grounding purposes. Other alternative housings 12 and/or stripper blade 14 configurations should be apparent to those of skill in the art of electronics, along with any number of variations of the components of the apparatus 10 of the preferred embodiment that could be readily adapted for any number of particular applications typically encountered by electricians.

In another variation of the apparatus 10 of the preferred embodiment, the apparatus 10 of the preferred embodiment can be configured in such a fashion so as to allow for adjustment and/or variability of the stripper blades 14 to accommodate a given range of wire sizes. For example, the apparatus 10 of the preferred embodiment could include a conventional drill chuck attached to the one or more stripper blades 14 that allows, for example, the stripping of variable gauge wires similar to how a drill chuck allows for the use of $1/16"$ diameter drill bit all the way to $3/8"$ diameter drills.

Figure 5:
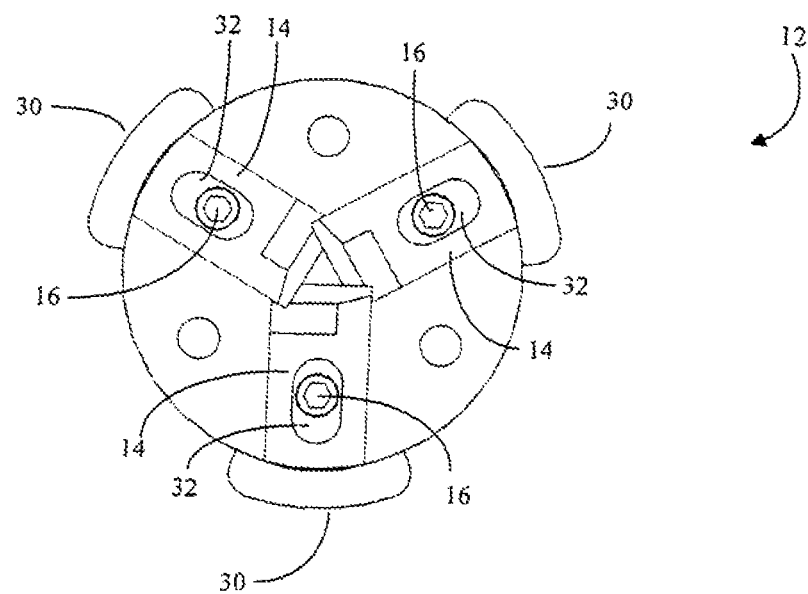
FIG. 5 is a plan view of a portion of an apparatus in accordance with another variation of the preferred embodiment of the present invention.
Figure 6:
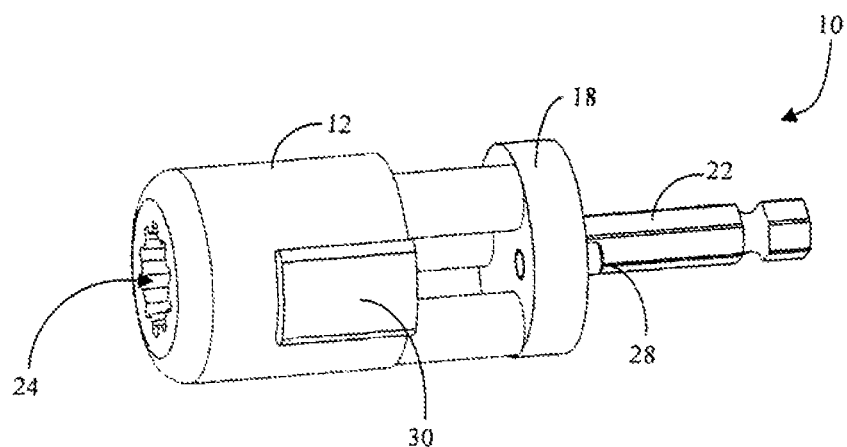
FIG. 6 is a perspective view of an apparatus in accordance with another variation of the preferred embodiment of the present invention.

In another variation of the apparatus 10 of the preferred embodiment, shown in FIGS. 5 and 6, the apparatus 10 of the preferred embodiment could include one or more chucks 30 configured as cams that allow for radial adjustment of the one or more stripper blades 14. As shown in FIG. 5, the stripper blades 14 can include elongated passages 32 that permit the stripper bolts 16 to selectively engage the stripper blades 14 at predetermined radii from the longitudinal axis X. In response to the position of the cam or chuck 30, the stripper blades 14 will be positioned at a predetermined distance from the longitudinal axis to allow for stripping of the wire insulation without damaging the wire itself. In another variation of the apparatus 10 of the preferred embodiment, the cam or chuck 30 can include a scale, indicia or other markings or indicators (not shown) to let a user know when the one or more stripper blades are disposed at an appropriate radius for use with any particular gauge of wire. For example, the cam or chuck 30 can include one or more numerical indicators that correlate a predetermined chuck position with the numerical designation of the wire gauge to be stripped.

Although the apparatus 10 of the preferred embodiment has been described with reference to a composite apparatus having multiple parts, it should be appreciated that the apparatus 10 described herein can readily be formed from a single component using CNC machining, molding and/or any other suitable process or manufacture. Alternatively, each component of the apparatus 10 of the preferred embodiment can be composed of similar and/or different materials suitable for withstanding the torque forces applied by the drill and the wire nut as well as the shearing forces generated by the stripper blades 14. Suitable materials include metals, alloys, composites, hardened polymers or any combination thereof derived to provide the desired longevity and performance required by the apparatus 10 of the preferred embodiment and variations thereof.

As a person skilled in the art of electrical tools will recognize from the previous detailed description and from the figures and claim, modifications and changes can be made to the preferred embodiment of the invention without departing from the scope of this invention defined in the following claims.

I claim:

1. An apparatus comprising:
   a wire nut receiver defining a cavity that extends from a proximal end to a distal end of the wire nut receiver, wherein the cavity defines a longitudinal axis about which the wire nut receiver is rotatable;
   one or more stripper blades adjustably mounted on the distal end of the wire nut receiver adjacent to the cavity thereof; and
   a driver connected in a non free-wheeling manner to the wire nut receiver, the driver being configured to rotate the wire nut receiver and one or more stripper blades in response to an external torque in a direction perpendicular to said longitudinal axis to substantially entirely remove insulation from a wire that is disposed in the cavity of the wire nut receiver and is in engagement with the stripper blades.

2. The apparatus of claim 1, wherein the one or more stripper blades are disposed substantially circumferentially at a predetermined radial distance from the longitudinal axis.

3. The apparatus of claim 2, wherein the predetermined radial distance can be varied in response to the gauge of the wire to be stripped.

4. The apparatus of claim 2, wherein the one or more stripper blades are aligned at an acute angle relative to a plane that is normal to the longitudinal axis.

5. The apparatus of claim 4, wherein the acute angle is less than approximately twenty degrees.

6. The apparatus of claim 1, wherein the driver comprises a hex drive receivable in a drill.

7. The apparatus of claim 1, wherein the cavity is configured to receive one of a standard wire nut, a wing nut, or a grounding wire nut.

8. The apparatus of claim 1, further comprising a chuck connected to the one or more stripper blades and adapted to adjust the radial distance of the one or more stripper blades relative to the longitudinal axis.

9. An apparatus comprising:
   a housing defining a wire nut receiver on a first end and a stripper blade receiver on a second end;
   one or more stripper blades disposed in the stripper blade receiver;
   a drive flange connected to the housing; and
   a driver connected in a non-free wheeling manner configured to rotate the drive flange and substantially entirely remove insulation from a wire disposed in the housing when engaged with the stripper blades; wherein said rotation is in a direction perpendicular to said longitudinal axis.

10. The apparatus of claim 9, wherein the housing further defines a cavity having a longitudinal axis about which the housing is rotatable.

11. The apparatus of claim 10, wherein the stripper blade receiver comprises a chuck adapted to adjust a radial distance of the one or more stripper blades relative to the longitudinal axis.

12. The apparatus of claim 10, wherein the one or more stripper blades are aligned at an acute angle relative to a plane that is normal to the longitudinal axis.

13. The apparatus of claim 12, wherein the acute angle is less than approximately twenty degrees.

14. The apparatus of claim 9, further comprising at least two stripper blades disposed in the stripper blade receiver.

15. The apparatus of claim 9, wherein the drive comprises a hex drive adapted to interface with one of a manual drill or a power drill.

16. An apparatus comprising:
   a housing defining a cavity along a longitudinal axis and a wire nut receiver on a first end of the cavity and a chuck on a second end of the cavity;
   one or more stripper blades connected to the chuck and aligned at an acute angle relative to a plane that is normal to the longitudinal axis, wherein the chuck is adapted to adjust a radial distance of the one or more stripper blades relative to the longitudinal axis; and
   a driver connected in a non-free wheeling manner to the housing and configured to rotate the chuck in a direction perpendicular to said longitudinal axis to substantially entirely remove insulation from a wire disposed in the housing when engaged with the stripper blades.

17. The apparatus of claim 16, further comprising a drive flange connected to the housing and the drive.

18. The apparatus of claim 16, wherein the one or more stripper blades connected to the chuck comprises three stripper blades connected to the chuck.

19. The apparatus of claim 16, wherein the drive comprises a hex drive adapted to interface with one of a manual drill or a power drill.

* * * * *